UNITED STATES PATENT OFFICE.

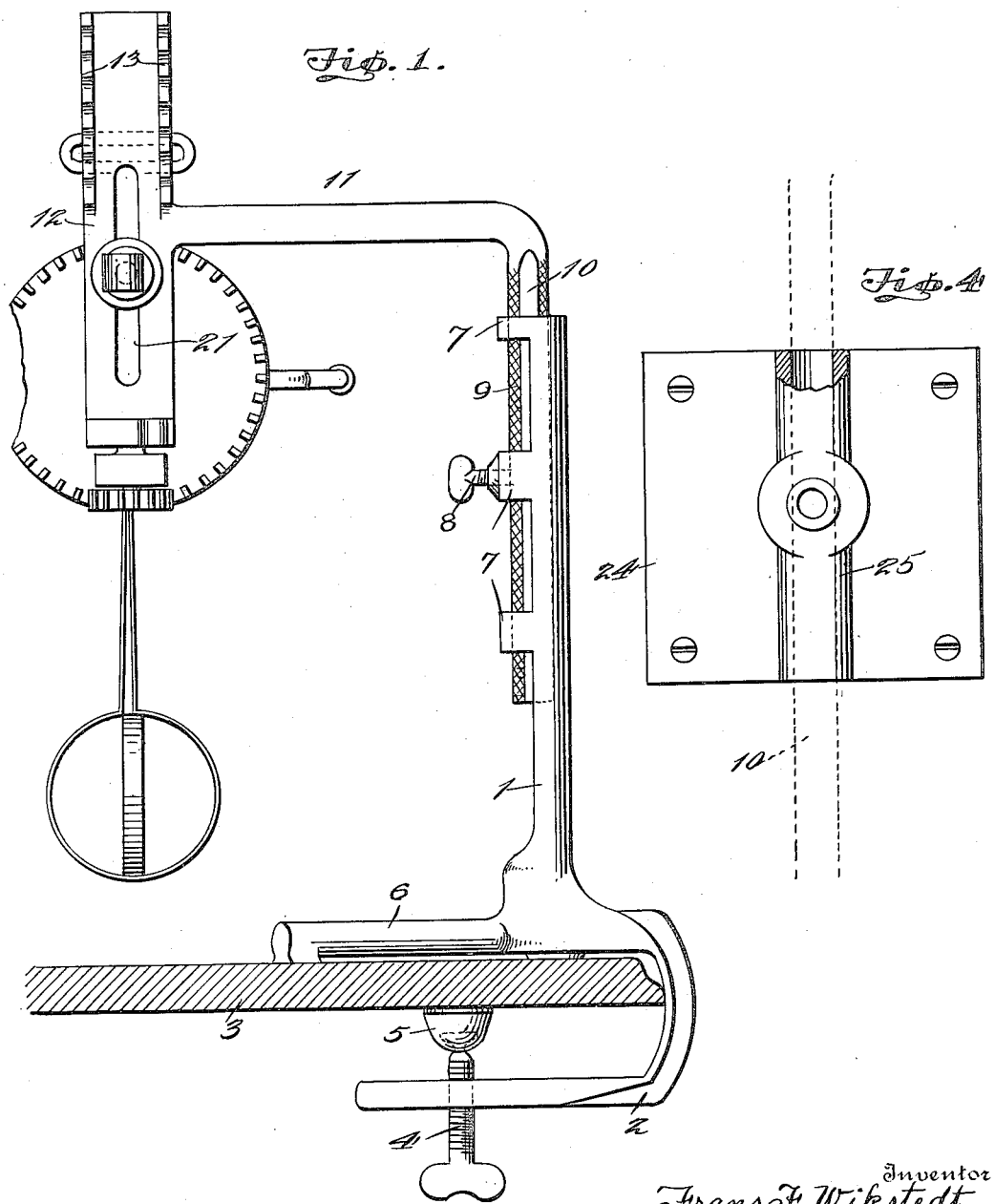

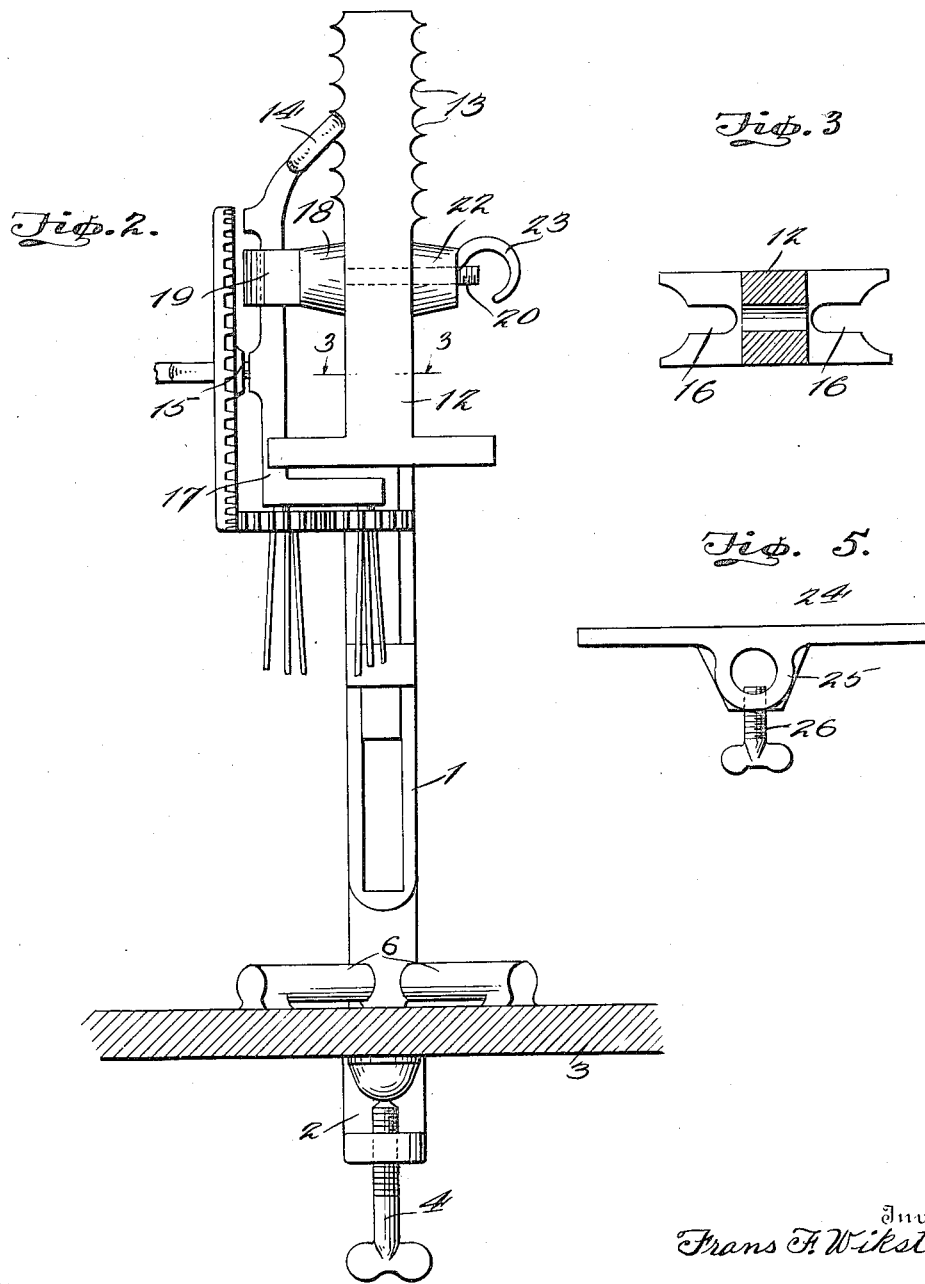

FRANS F. WIKSTEDT, OF FITCHBURG, MASSACHUSETTS.

EGG-BEATER HOLDER.

1,225,907.

Specification of Letters Patent.

Patented May 15, 1917.

Application filed August 13, 1915. Serial No. 45,358.

*To all whom it may concern:*

Be it known that I, FRANS F. WIKSTEDT, a citizen of the United States, residing at Fitchburg, in the county of Worcester and State of Massachusetts, have invented certain new and useful Improvements in Egg-Beater Holders, of which the following is a specification.

This invention has relation to certain new and useful improvements in egg beater holders, and has for its primary object the provision of an improved form of holder for the conventional form of egg beater.

The invention has for another object, the provision of a holder of this character which will be constructed in such manner that it may be readily secured to a shelf or other support and the conventional form of egg beater securely fastened to the holder.

The invention has for a further object, the provision of a simple form of holder of the above-stated character which consists of a main portion adapted to be clamped or otherwise secured to the support and an adjustable egg beater supporting member, and means which may be readily employed to clamp an egg beater to the adjustable member.

The invention has for a still further object the provision of a holder of this character which may be readidly assembled and secured to a stationary support and connected with an egg beater adjusted to support the latter the desired distance above the shelf or table upon which is placed the receptacle containing the eggs or a mixture of other materials to be agitated or beaten by the egg beater.

A still further object of the invention resides in the provision of a holder of the above stated character which will be formed of a minimum number of parts of simple construction and which may be readily and cheaply manufactured.

With the above and other objects in view, the invention resides in the novel construction, combination, and arrangement of parts as hereinafter set forth in the specification, pointed out in the claims and shown in the accompanying drawings, in which—

Figure 1 is a side elevation of the complete device assembled and showing an egg beater of the conventional form secured to the same;

Fig. 2 is a front elevation of the invention as shown in Fig. 1;

Fig. 3 is a transverse section through the egg beater supporting standard taken substantially on the plane of line 3—3 of Fig. 2 and looking in the direction indicated by the arrows;

Fig. 4 is an elevation of the supporting plate to be employed when the holder is to be secured to a wall;

Fig. 5 is a top plan view of the same.

Referring more particularly to the drawings in which similar reference characters designate corresponding parts throughout the several views, 1 designates the supporting standard, from the lower end of which projects the downwardly and inwardly extended clamp arm 2 for engagement beneath the shelf 3 or other support and carrying the clamp screw 4 having a swiveled head 5 for clamping engagement with the under face of the support 3, while the upper clamp arms 6 radiating from the lower end of the supporting standard, bear against the upper face of the support 3, as clearly shown in Figs. 1 and 2, thereby securely retaining the supporting standard 1 against movement.

A plurality of perforated ears 7 project from one face of the supporting standard 1 and within at least one of these ears 7 is threaded a thumb screw 8 for binding engagement with a roughened face 9 of the adjustable arm 10 having sliding engagement through the perforated ears 7, the thumb screw 8 serving, when tightened, to secure the adjustable arm 10 in adjusted position. The upper portion of the adjustable arm 10 is extended in a horizontal direction and designated by the numeral 11 and has formed thereon the egg beater supporting standard 12, which will now be fully described.

The egg beater supporting standard 12 is provided along its vertical edges and upon its opposite sides with opposite serrations 13 to form recesses to receive the upper edge of the handle 14 of an egg beater 15 of conventional form which may be positioned upon either side of said standard 12. The lower end of the standard 12 is also extended outwardly in opposite directions and bifurcated, as shown at 16, to receive the vertical stationary portion 17 of the egg beater 15 by which the handle and gears of the egg beater are carried. The egg beater is securely clamped in this position, as shown in Figs. 1 and 2, by means of a clamp screw 18 which has a hook end 19 engaged around the stationary portion 17 above the bifurcated lower end of the standard 12 and below the handle 14, the shank 20 of the clamp screw 18 extending through the vertical elongated slot 21 of the standard 12 and having threaded thereon a clamp nut 22 to clamp tightly in position the egg beater 15. The clamp nut 22 also has a hook 23 formed thereon so that, if desired, it may be engaged with the egg beater or the hook 23 may be employed for rotating the nut 22 upon the shank 20 of the clamp screw 18. It will also be evident that the egg beater may be secured to either side of the standard 12 and the height of the egg beater may be readily adjusted upon the standard 12 and the clamp screw 18 moved to proper position within the slot 21. It will further be apparent that the adjustable arm 10, by which the standard 21 is carried, may be readily adjusted to vary the height of the standard 12 and egg beater 15 with respect to the support 3.

In Figs. 4 and 5 I have shown a supporting plate 24 which may be readily secured upon a wall or other vertical stationary support 7 and is provided upon its outer face with a socket 25 to receive the vertical portion of the adjustable arm 10, as indicated by dotted lines in Fig. 4, a set-screw 26 being threaded through the socket 25 for binding engagement with the adjustable arm 10 to secure the latter in adjusted position.

It will be readily seen that when an egg beater 15 or the like is secured upon this form of holder, it will be securely held in proper position and may be readily operated by either hand. It will also be apparent that the egg beater may be readily secured in position on either side of the standard or removed as desired.

While the preferred embodiments of the invention have been clearly shown and illustrated, it will be understood that minor changes in the details of construction and arrangement of parts may be resorted to within the scope of the appended claims without departing from the spirit of the invention or sacrificing any of the advantages of the same.

What is claimed is:

1. A device of the class described comprising an upright rigidly supported socket, a stem adapted to be raised and lowered in said socket and having an arm projecting horizontally therefrom, means for securing said stem to said socket in any adjusted position, a vertical plate terminating the outer end of said arm, and locking means adjustable on said plate for clamping an agitator in engagement therewith.

2. A device of the class described comprising an upright rigidly supported socket, a stem adapted to be raised and lowered in said socket and having an arm projecting horizontally therefrom, means for securing said stem to the socket in any adjusted position, a vertical plate terminating the outer end of said arm, means on opposite sides of said plate for supporting an agitator in adjusted position on either side, and means for clamping said agitator to said plate.

3. A device of the class described comprising an upright rigidly supported socket, a stem adapted to be raised and lowered in said socket and having an arm projecting therefrom, means for securing said stem to the socket in any adjusted position, a vertical plate terminating the outer end of said arm, vertically disposed serrations forming recesses on opposite sides of said plate for adjustably supporting an agitator member on either side, and a clamping member movable vertically in a slot in said plate to lock said agitator member in operative position.

4. A device of the class described comprising an upright rigidly supported socket, a stem adapted to be raised and lowered in said socket, means for securing said stem to the socket in any adjusted position, a vertical plate carried by said stem, vertically disposed serrations forming recesses on opposite sides of said plate at its upper end, a laterally projecting and bifurcated extension from the lower end of said plate on each of said sides, said recesses and extensions adapted to support an agitator in adjusted position on either side, and a locking bolt vertically adjusted in a slot in said plate adapted to clamp said agitator member to the plate in operative position.

In testimony whereof I affix my signature in presence of two witnesses.

FRANS F. WIKSTEDT.

Witnesses:
HENNING J. JOHNSON,
JOHN G. ANNALA.